US007464912B2

(12) United States Patent
Ricco et al.

(10) Patent No.: US 7,464,912 B2
(45) Date of Patent: Dec. 16, 2008

(54) METHOD FOR OBTAINING A FUEL INJECTOR FOR AN INTERNAL-COMBUSTION ENGINE, AND AN INJECTOR MADE ACCORDING TO SAID METHOD

(75) Inventors: Mario Ricco, Valenzano (IT); Sisto Luigi De Matthaeis, Valenzano (IT); Adriano Gorgoglione, Valenzano (IT); Sergio Stucchi, Valenzano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 174 days.

(21) Appl. No.: 11/111,065

(22) Filed: Apr. 21, 2005

(65) Prior Publication Data

US 2006/0000931 A1 Jan. 5, 2006

(30) Foreign Application Priority Data

Jun. 30, 2004 (EP) .................................. 04425476

(51) Int. Cl.
*F16K 31/02* (2006.01)

(52) U.S. Cl. .................................... 251/129.16; 251/64

(58) Field of Classification Search ................... 251/64, 251/129.15, 129.16
See application file for complete search history.

(56) References Cited

U.S. PATENT DOCUMENTS

| | | | | |
|---|---|---|---|---|
| 5,185,919 | A | 2/1993 | Hickey | 29/602.1 |
| 5,244,180 | A * | 9/1993 | Wakeman et al. | 251/129.16 |
| 5,289,627 | A | 3/1994 | Cerny et al. | 29/602.1 |
| 5,341,994 | A | 8/1994 | Wakeman | 239/585.5 |
| 5,918,818 | A * | 7/1999 | Takeda | 239/585.1 |
| 5,927,614 | A | 7/1999 | Touvelle et al. | 239/585.1 |
| 6,012,700 | A * | 1/2000 | Johnson et al. | 251/129.15 |

FOREIGN PATENT DOCUMENTS

| | | |
|---|---|---|
| EP | 0 471 212 A1 | 2/1992 |
| EP | 0 483 768 A1 | 5/1992 |

* cited by examiner

*Primary Examiner*—John K Fristoe, Jr.
(74) *Attorney, Agent, or Firm*—Seed IP Law Group PLLC

(57) ABSTRACT

A fuel injector for an internal-combustion engine comprises an injector body and an injection-control valve, which in turn comprises: an open/close element; an elastic thrust element for pushing the open/close element; and a solenoid actuator, which can be actuated for exerting an action countering the thrust exerted by the elastic element. The solenoid actuator is formed by a monolithic assembly obtained in a mould, in which there is injected, on a core and a coil coupled to one another, a plastic material, which defines, once it has solidified, a body for insulation of the core from the injector body and which forms, once it has solidified, a monolithic assembly with the core and the coil.

5 Claims, 3 Drawing Sheets

METHOD FOR OBTAINING A FUEL INJECTOR FOR AN INTERNAL-COMBUSTION ENGINE, AND AN INJECTOR MADE ACCORDING TO SAID METHOD

BACKGROUND OF THE INVENTION

1. Field of the Invention

The present invention relates to a method for obtaining a fuel injector for an internal-combustion engine. In particular, the present invention relates to a method for obtaining a fuel injector comprising a hollow injector body and an injection-control valve. The valve in turn comprises: a valve body of a tubular shape inserted into the injector body; an open/close element pressed against a head surface of the valve body by an elastic thrust element; and a solenoid actuator which can be actuated to exert an action countering the one exerted by the elastic element and to enable the open/close element to recede from the aforesaid head surface.

2. Description of the Related Art

In the known solutions, the solenoid actuator comprises: a core; a coil housed in the core and provided with a pair of rod-shaped contacts traversing the core for the connection of the coil to a control unit for controlling injection; and a set of parts to be assembled so as to form, once they have been assembled, a block of non-magnetic material such as to guarantee magnetic insulation of the core from the injector body and electrical insulation of the rod-shaped contacts. The block of non-magnetic material is normally made of non-magnetic steel or brass.

Even though known injectors of the type described above are employed, they entail relatively high production costs and relatively long times for assembly. This may basically be put down to the fact that the block of non-magnetic material is relatively complex from a production standpoint since it has to be coupled at least partially to the rods and to the core, ensuring, at the same time, the necessary electrical and magnetic insulation and correct positioning of the electromagnet in the injector. Each part that constitutes the non-magnetic block requires specific machining operations on almost dedicated machine tools, with particularly long production times. Furthermore, the assembly operation, which involves also the core and the coil, proves particularly complex and such as to require dedicated machines and specific equipment and/or the use of specialized manpower, thus increasing the production times and costs.

BRIEF SUMMARY OF THE INVENTION

One purpose of the present invention is to provide a method for making a fuel injector, which provides a simple and economically advantageous way of construction.

According to the present invention, a method is provided for making a fuel injector for an internal-combustion engine and comprising an injector body, and an injection-control valve, which, in turn, comprises an open/close element. The fuel injection also includes an elastic thrust element for pushing said open/close element; and a solenoid actuator which can be actuated for exerting an action countering the one exerted by the elastic element. The solenoid actuator comprises: a coil, a core, and a body made of non-magnetic and insulating material for carrying the core and the coil and insulating them from said injector body. The method is characterized in that the core and the coil are inserted into a mould having a cavity delimited by a surface substantially complementary to the one delimiting said body made of insulating material, the core and the coil are positioned inside said mould, and a plastic material is injected in said cavity for englobing at least partially said core and forming with the core and said coil a monolithic assembly.

Preferably, in the method defined above, the core and the coil are coupled to one another prior to their introduction into said mould.

The present invention also relates to a fuel injector for an internal-combustion engine.

According to the present invention, a fuel injector for an internal-combustion engine is provided, which comprises an injector body and an injection-control valve, which in turn comprises an open/close element, an elastic thrust element for pushing the open/close element, and a solenoid actuator, which can be actuated for exerting an action countering the thrust exerted by the elastic element. Said solenoid actuator comprises a core, a coil, and a body made of non-magnetic and insulating material for carrying the core and the coil and insulating them from said injector body. Said fuel injector is characterized in that said body made of insulating material is made of plastic material molded directly onto said core to form with said core and said coil a monolithic block.

Preferably, in the injector defined above, said coil carries two rod-shaped electrical contacts; at least one intermediate portion of said electrical contacts being embedded in said body made of plastic material.

BRIEF DESCRIPTION OF THE SEVERAL VIEWS OF THE DRAWING(S)

The invention will now be described with reference to the annexed plate of drawings, which illustrate a non-limiting example of embodiment thereof, and in which.

DETAILED DESCRIPTION OF THE INVENTION

Figure 1:
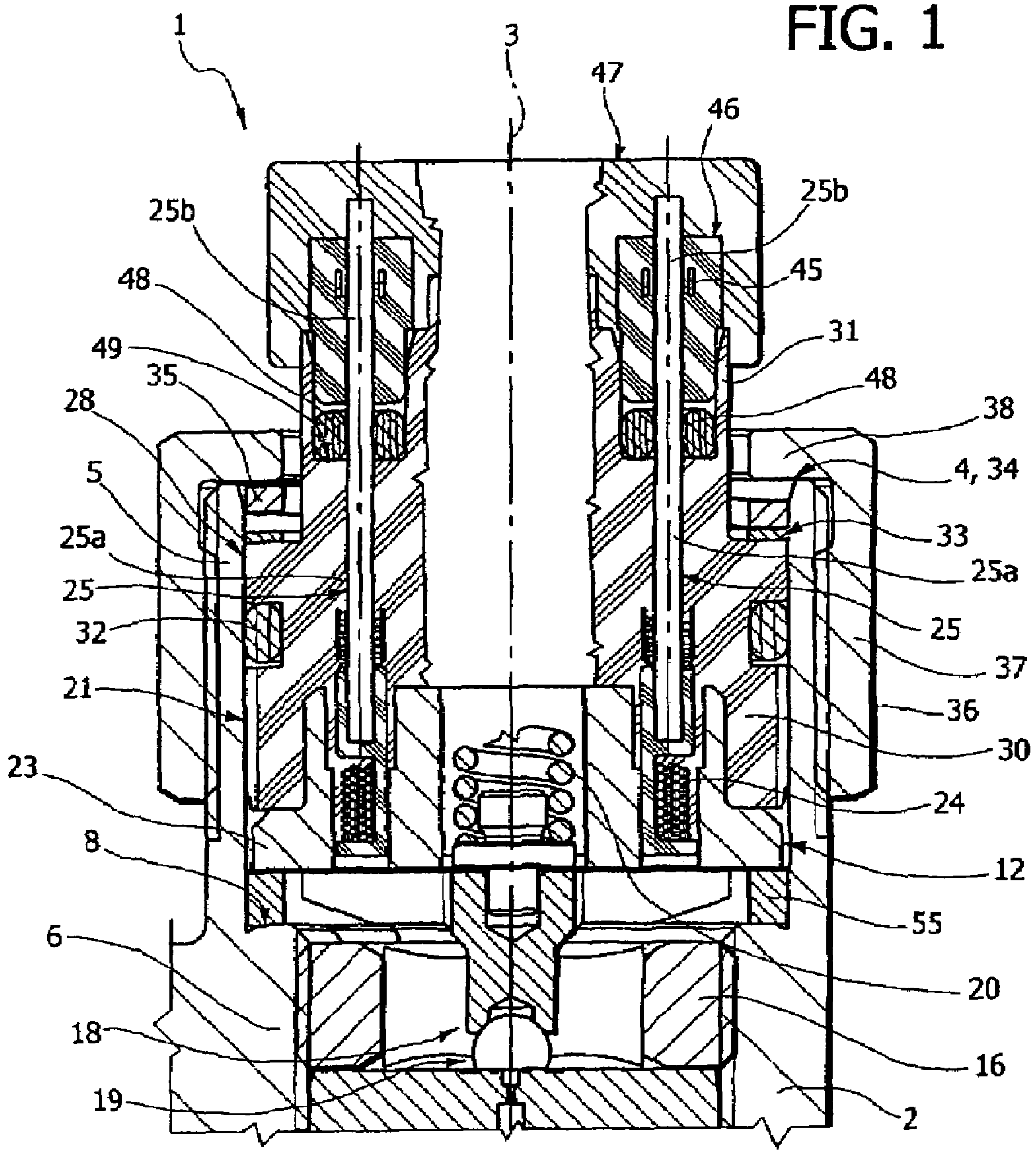
FIG. 1 is a cross-sectional view, with some parts not shown to show other features more clearly, of a fuel injector for an internal-combustion engine made according to the present invention.

In FIG. 1, the reference number 1 designates, as a whole, a fuel injector for an internal-combustion engine (not illustrated).

The injector 1 comprises an injector body 2 of a tubular shape having an axis 3 and comprising, starting from the free top end 4, two tubular stretches, designated by 5 and 6, which have internal diameters decreasing starting once again from the aforesaid free top end 4. The stretches 5 and 6 are adapted to one another by an internal shoulder 8 orthogonal to the axis 3, and house an injection-control valve 12 secured via a ring-nut 16. The valve 12 further comprises an open/close element 18, which is pushed against a contrast surface 19 by a helical compression spring 20, and is retracted from the surface 19 itself by the countering action exerted by a solenoid actuator 21 forming part of the valve 12 and partially housed in the stretch 5.

Once again with reference to FIG. 1, the solenoid actuator 21 comprises a hollow core 23, a coil 24, in itself known, housed in the core 23 and provided with a pair of rod contacts 25, which are parallel to the axis 3 and are set at a distance from one another in the transverse direction, and which project in cantilever fashion beyond the stretch 5 (FIG. 1).

The solenoid actuator 21 further comprises a body 28 made of plastic material, preferably polyamide with fiber-glass fillers, for example "Zytel" or "Stanyl", in which there are embedded part of the core 23, part of the coil 24, and part of the intermediate stretches 25*a* of the electrical contacts 25, the top terminal stretches 25*b* of which project axially in cantilever fashion beyond the body 28. In the specific case, the body 28 has two portions integral with one another, designated by 30 and 31, of which the portion 30 has outer dimensions approximating (albeit smaller than) the internal dimensions of the tubular stretch 5, to which the portion 30 itself is coupled via the interposition of a seal gasket 32. The portion 31, which projects on the outside of the end stretch 5, has an outer diameter decidedly smaller than that of the portion 30, and is adapted to the portion 30 itself via an annular intermediate axial shoulder 33 orthogonal to the axis 3. The shoulder 33 is set at a distance from a top end edge 34 of the stretch 5 by a pre-set amount and defines a resting surface for a compression spring 35, conveniently of the Belleville type or crinkle-washer type, forced against the shoulder 33 by a ring-nut 36 shaped like a cup set upside down, one side wall 37 of which is screwed on an outer threading of the stretch 5, and one annular end wall 38 of which surrounds, with radial play, the stretch 31 of the body 28, is set so that it bears upon the top edge 34 of the stretch 5, and defines an axial contrast for the Belleville spring or crinkle washer 35.

Figure 3:
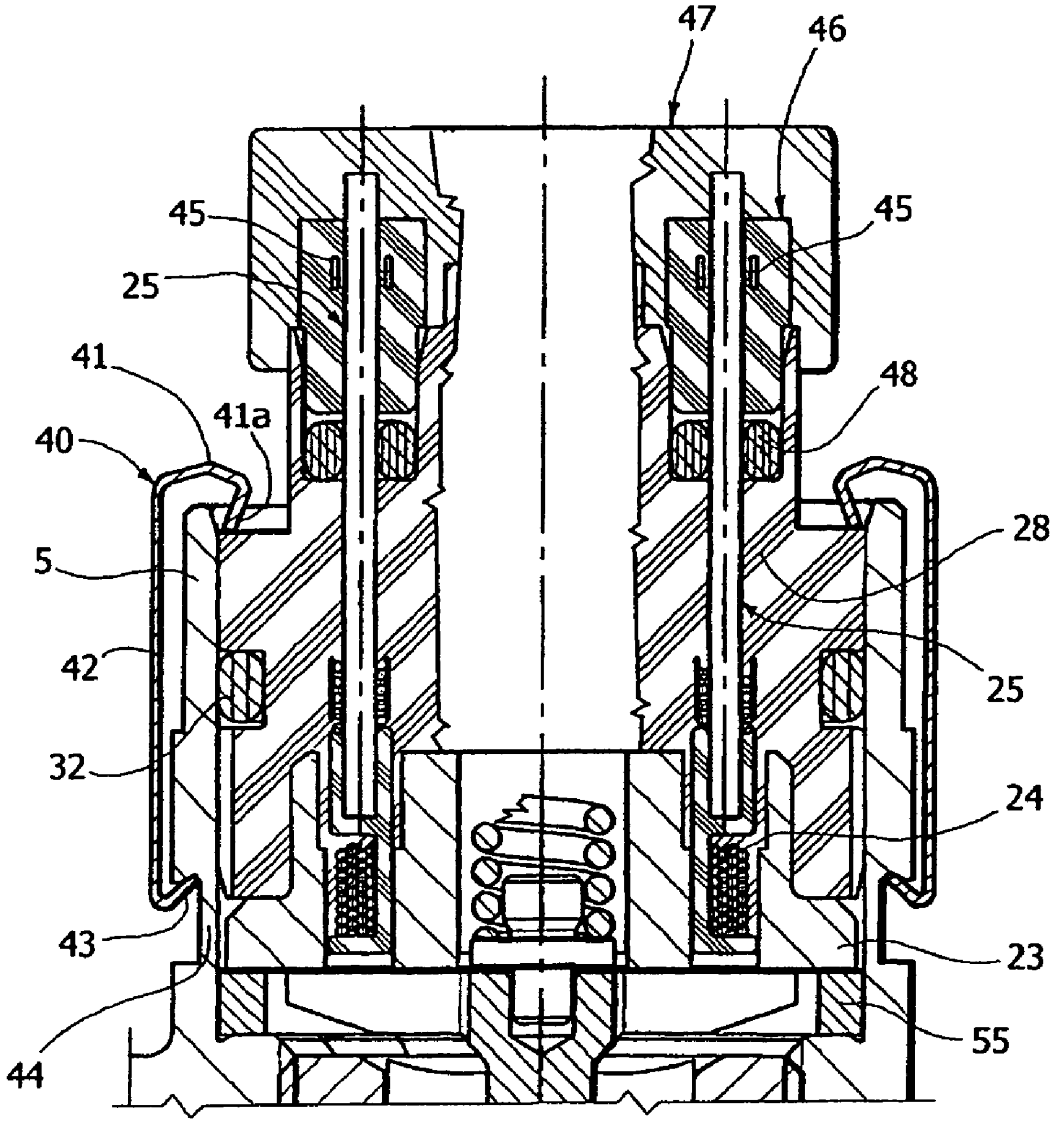
FIG. 3 is similar to FIG. 1 and is a cross-sectional view, with some parts not shown to show other features more clearly, as a variant of an item represented in FIG. 1.

In the variant illustrated in FIG. 3, the ring-nut 36 and the spring 35 are replaced with an elastic body 40 for gripping, which is, for example, of the type described in the European patent EP-B-1 219 823, filed in the name of the present applicant and, in any case, comprises a collar 41, which is fitted, with play, on the stretch 31 and comprises an axial projection 41*a* co-operating with the shoulder 33 by bearing upon it. The collar 41 carries coupled thereto one or more elastically deformable stays 42 (two of which are the ones illustrated in FIG. 3), which are, conveniently, integral with the collar 41, extend downwards, and terminate with two engagement portions 43 for engaging via snap action in respective retention seats 44 of the injector body 2. Alternatively, according to a variant (not illustrated), the retention seats 44 are obtained on an auxiliary body carried by the injector body.

Once again with reference to FIG. 1, the terminal stretches 25*b* of the rods 25 are electrically connected, in a known way, to respective terminals 45, carried by a terminal block 46 housed in an electrical-insulation cap 47. Again with reference to FIG. 1, for each rod 25 provided between the terminal block 46 and the body 28 is a respective seal gasket 48, which surrounds the corresponding rod 25 and is housed in a blind axial cavity 49 of the body 28. According to a variant (not illustrated), the valve is without the gaskets 48 and tightness is ensured by the coupling between the rods and the body made of plastic material.

Figure 2:
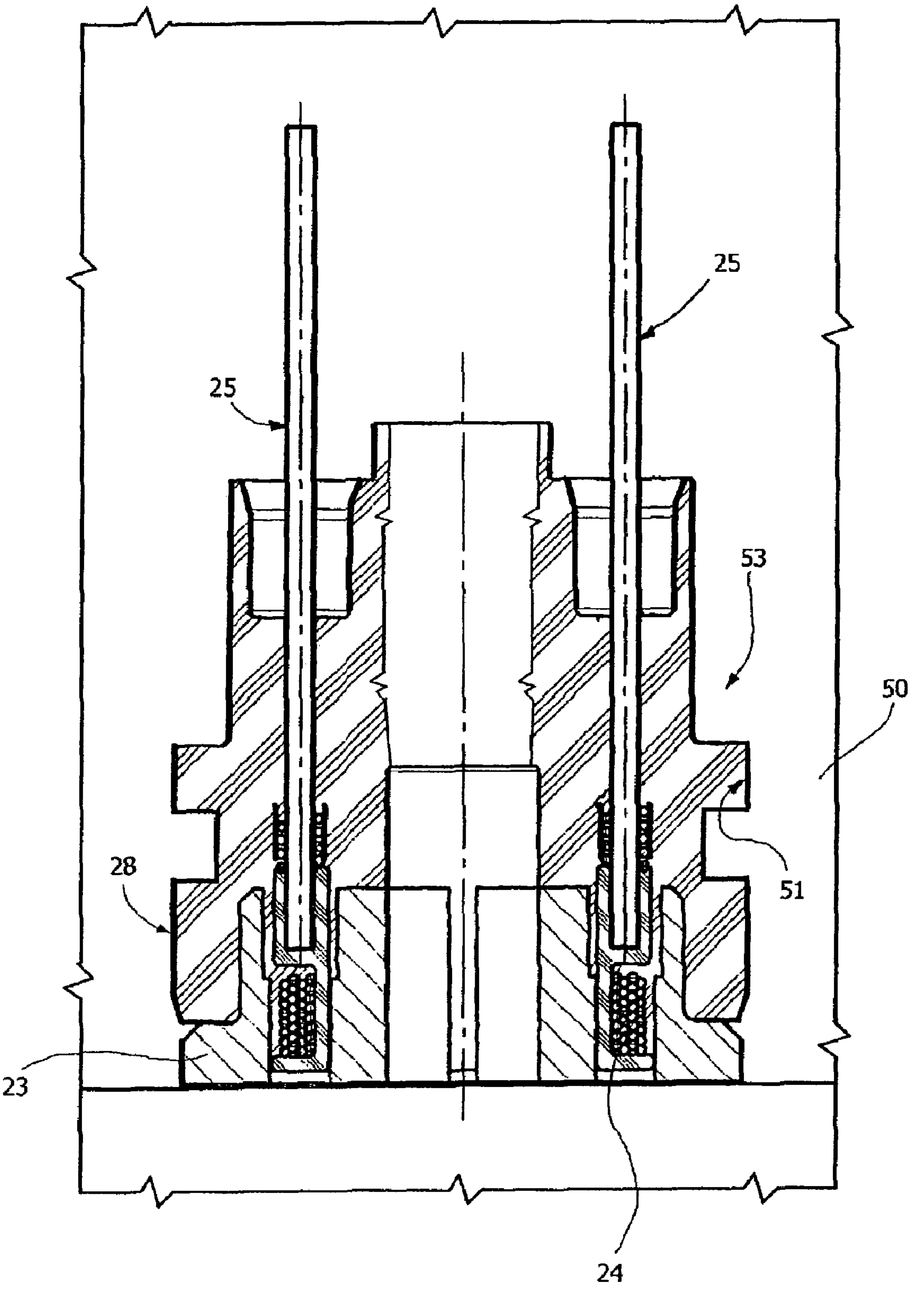
FIG. 2 is a cross-sectional view of an item represented in FIG. 1 set in a mould, also partially illustrated.

The injector 1 described is obtained according to the following procedure. First, the coil 24 provided with the rods 25 and the core 23 are inserted and positioned in a mould 50, partially illustrated in FIG. 2, which has a cavity 51 delimited by an internal surface substantially complementary to the external lateral surface of the body 28. Preferably, the coil 24 and the core 23 are coupled to one another prior to being inserted into the mould 50. In any case, once they have been positioned in the mould 50, the latter is closed and, inside the cavity 51, there is injected the plastic material that is to form the body 28, embedding in the plastic material itself part of the core 23 and of the coil 24 beyond the intermediate portion 25*a* of the rods 25. Once solidification has occurred, the core 23, the coil 24, the rods 25, and the body 28 are locked in fixed relative positions and consequently constitute different parts of a stable block or monolithic assembly 53, which is electrically and magnetically insulated and which can no longer be disassembled. Following upon extraction of the monolithic assembly from the mould 50, the gasket 32 is housed in its own seat, after which the valve 12 is inserted into the injector body 2 and secured via the ring-nut 16. Then the assembly 53 is inserted into the stretch 5 of the injector body 2 until the core 23 is brought up against a spacer ring 55 (FIG. 1), which is preferably made of a non-magnetic and insulating material and is set so that it bears upon the shoulder 8. Alternatively, the ring 55 could be an ordinary spacer ring. At this point, the spring 35 is set so that it bears upon the shoulder 33, and the ring-nut 36 shaped like a cup set upside down is fitted on the body 28 and screwed onto the stretch 5 until its end wall 38 sets itself bearing upon the terminal edge 34 of the stretch 5. Following upon fitting-on of the ring-nut 36, the terminal block 46 couples to the rods 25 and to the cap 47 in a known way. Alternatively, the terminal block and the cap are assembled on the monolithic assembly prior to their installation in the injector body.

From the foregoing description it appears clearly evident that, as compared to known solutions, molding of the body 28 made of plastic material directly on the core 23 and on the coil 24 enables, on the one hand, a perfect electrical and magnetic insulation between the various parts to be guaranteed and, on the other, a reduction in the times and costs of production and assembly. In fact, in a single molding operation the body 28 is obtained, with the core 23 and the coil 24 fixed simultaneously to one another and to the body 28 itself. In addition, on account of the molding operation, also the rods 25 are embedded in the plastic material, and consequently the required fluid tightness is ensured, so that the gaskets 48 in this case perform only a safety function and in some cases can even be omitted.

The use of the ring-nut 36 screwed on the injector body 2 so that it couples with the elastic element 35 enables the monolithic assembly 53 to be gripped and blocked elastically inside the injector body 2 and, in particular, makes it possible to separate the gripping load of the monolithic assembly 53 from the gripping torque of the ring-nut 36, since the travel of the ring-nut 36 is limited by the contrast of its annular wall 38 against the edge 34 of the injector body 2. The gripping load is instead determined only by the stiffness and working length of the elastic element. The aforesaid length is equal to the distance between the two contrast surfaces 33 and 34 and can be defined in the design stage so that the required load is provided exactly. Furthermore, if the stiffness of the elastic element is sized in an appropriate way, the aforesaid load remains practically invariant both in normal operating conditions and in the case where the body 28 presents geometrical or dimensional variations, for example because it is subjected to high thermal gradients.

The use of fast-action clamps instead of the ring-nut 36 and springs 35, as illustrated in FIG. 3, enables a further reduction in the times required for assembly and for maintenance and repair.

From the foregoing description it is clear that modifications and variations can be made to the injector 1 described herein, without departing from the sphere of protection of the present invention. In particular, the body 28 could be made with a material different from the one described herein by way of example, and the monolithic assembly 53 obtained in the mould could have shapes and dimensions different from the ones indicated and could be coupled to the injector body 2 in a way different from the one described herein by way of example.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A fuel injector for an internal-combustion engine, comprising:

an injection-control valve including an open/close element, an elastic thrust element configured to push the open/close element, and a solenoid actuator configured to exert an action countering the thrust exerted by the elastic thrust element upon actuation, the solenoid actuator including a hollow core, a coil housed in said core and provided with a pair of electric rod-shaped contacts, and an insulating body made of plastic material moulded directly on said core as to form a monolithic block to electrically and magnetically insulate said core, said insulating body embedding at least part of said core of said coil and of an intermediate stretch of each of said rod-shaped contacts, said insulating body including a first portion having outer dimensions, and a second portion adapted to said first portion by an intermediate annular shoulder;

an injector tubular body having an axis substantially parallel to the electric rod-shaped contacts, the injector tubular body including a first tubular stretch and a second tubular stretch defining a shoulder orthogonal to said axis, said first tubular stretch being adapted to house the injection-control valve and having internal dimensions, the outer dimensions of said first portion of said insulating body approximating the internal dimensions of said first tubular stretch;

a ring nut screwed on said first tubular stretch and connecting the injection control valve to said tubular body, said ring-nut including an axial reference surface set so as to bear upon a reference surface carried by said tubular stretch; and a compression spring positioned between said axial reference surface and said intermediate annular shoulder to cause said monolithic block to be elastically gripped and blocked inside the injector body.

2. The fuel injector according to claim 1, further comprising:

two terminal blocks, each having an electric terminal wherein each of said rod-shaped contacts include a top terminal stretch projecting axially in a cantilever fashion beyond said insulating body and electrically connected to a respective electric terminal carried by the relevant terminal block.

3. The fuel injector according to claim 2 wherein said tubular body includes an electrically insulating cap configured to house said terminal blocks.

4. The fuel injector according to claim 1, further comprising:

a spacer ring, wherein said compression spring urges said monolithic block to cause said core to bear upon the shoulder of said tubular stretch by the intermediary of the spacer ring.

5. The injector according to claim 1, characterized in that it comprises, for each of said rods, a respective seal gasket set between the corresponding said rod and said body made of plastic material.

* * * * *